Dec. 31, 1963  E. E. ROBERTSON  3,115,852
COMBUSTION PRODUCTS CONDENSER
Filed April 7, 1961

INVENTOR
ERNEST E. ROBERTSON
HIS ATTYS

United States Patent Office 3,115,852
Patented Dec. 31, 1963

3,115,852
COMBUSTION PRODUCTS CONDENSER
Ernest E. Robertson, Winnipeg, Manitoba, Canada
Filed Apr. 7, 1961, Ser. No. 101,568
2 Claims. (Cl. 110—56)

My invention relates to new and useful improvements in the operation of sources of heat utilizing the combination of hydro carbons and air for combustion purposes, the principal object and essence of my invention being to provide a condenser system within the exhaust gas duct adapted specifically to condense out from the exhaust gases, the relatively high water vapor content normally occurring therein.

Depending on the type of fuel used, such as coal, oil, or natural gas, a relatively high proportion of the flue gases consists of water vapor and it is the heat of evaporation of this water vapor which I recover. For example, with coal as a fuel, the loss resulting from products of combustion containing water vapor amounts to approximately 3½% of the heat of the fuel whereas in oil the water vapor creates a heat loss of about 9%. In sub-bituminous coal the free moisture content of the fuel may run up to 40% or more as in the case of lignite. Even in the most modern lignite thermal power plants, hydrogen loss is of the order of 7%.

However, the greatest hydrogen loss exclusive of free moisture in fuel is in the burning of natural gas in which the flue gas loss attributable to water vapor resulting from hydrogen loss in the flue gases is between 20% and 32% of all the heat introduced into the furnace. It should be stated here that this device differs from conventional economizers, super-heaters, or air pre-heaters which are designed specifically to obtain or recover sensible heat from the dry constituents of the flue gases thereby cutting down on the dry stack loss. In fact, these devices are designed specifically so that they will not condense any of the vapors from the flue gases whereas the present device is designed specifically for this purpose.

Although the drawings and specifications accompanying this invention are directed to a natural gas fired furnace for use in residence or the like, nevertheless it will be appreciated that my device is readily adaptable for industrial use, and if utilized in an industrial smoke stack separately or in combination with electrostatic precipitators, then only carbon dioxide and nitrogen would be discharged into the atmosphere with the resulting improvement in the so-called smog conditions which exist at present in many industrial locations. This is because the majority of the harmful ingredients in industrial smoke are in the vapor form and which, with adequate control, can be condensed from the flue gases before same reach the atmosphere.

The condensate on the surface of the condenser will attract free dust particles and simulate, without addition of water, a so-called "sliming" system sometimes used to carry away suspended particles in flue gas.

The principal object of my invention can, therefore, be stated to consist of the provision of a condenser within the flue gases adapted to condense and collect the water content therefrom plus a high percentage of any suspended particles in the flue gas.

A further object of my invention is to provide a device of the character herewithin described in which the condenser is cooled by external air being drawn therethrough, which air is heated by the condensing of the water upon the outside of the condenser and which is then led to the fire chamber of the heating device thus supplying preheated air for combustion with the fuel.

In conventional installations, some condensation occurs normally upon the walls of the chimney or smoke stack which tends to corrode, erode or otherwise damage the chimney structurally. It has, therefore, long been the universal practice to have these flue gases maintained at a fairly high temperature in relation to normal existing temperatures inside or outside of the building, not only to ensure adequate exhaust or discharge, but also to minimize the possibilities of this condensation occurring, but with the installation of my condenser, as much as possible of the water vapor in the flue gas is purposely condensed on the surface thereof and routed to a convenient disposal point externally of the exhaust duct or chimney.

Another object of my invention is to provide a device of the character herewithin described in which the latent heat of evaporation which is recovered by the coolant in the condenser, can be put back to use either in the form of pre-heated air for the combustion chamber or for other uses as desired.

A still further object of my invention is to provide a device of the character herewithin described in which the combustion air is drawn externally of the building thereby eliminating the use of air within the building for combustion purposes. Drawing air for combustion from the atmosphere within the building has the disadvantage of using air which has been pre-heated by the heating system in the building for the purpose of keeping the building warm and not to provide pre-heated combustion air. Furthermore, the removal of atmosphere from the furnace room creates a reduced air pressure within the building leading to an uncontrolled ingress of air at many points therethrough. Indeed, if such ingress does not occur there is a danger of the furnace being starved for air and serious interruptions of efficient combustion can therefore result. Furthermore, this device is of particular use in reducing off-cycle heat losses, which losses are usually very high particularly in domestic installations. This is because the condenser tube and flue pipe act as a natural U-tube thereby giving an air dynamic balancing effect when the burner is off. This has the effect of diminishing considerably the off-cycle draft normally present in burner installations and, which under certain circumstances, may account for as much as a 20% heat loss.

As hereinabove mentioned, my device is particularly applicable to furnaces burning natural gas and where existing installations are to be switched from fuel such as coal or oil to natural gas, it is usually necessary to modify the chimney in order to make it suitable for the high vapor content of gas fired smoke products. This is because the smoke stacks of such installations are usually lined with precipitated carboniferous products of combustion and due to the extremely high water vapor content of natural gas flue gases, much unwanted condensation will take place which, in connection with the aforementioned precipitates, can cause an extremely corrosive action to take place on the inside of smoke stacks. It is usually, therefore, necessary to line the smoke stacks with a metal conduit before changing to a natural gas installation. However, by installing my condenser system, this lining is not required as the high water vapor content is condensed purposely by my condenser and removed from the smoke stack.

Once again referring to a natural gas installation, preheated air is recommended wherever possible in order to lower the percentage of air.

Summarizing the improvements derived from my invention, the following advantages result from the use of same.

Most of the water vapor in the flue gases will be condensed on a surface adjacent to combustion or process air moving in the opposite direction to flue gases so the latent heat of evaporation will be recovered and can be put back to use. This will result typically in the recovery of 5% to 35% of the total heat content of the fuel as fired.

Condensation will occur in the chimney under controlled conditions on surfaces designed for the purpose. This will minimize unwanted condensation on the walls of the chimney.

The U-tube effect of the structure results in a material reduction of the off-cycle heat losses due to the aerodynamic balancing occurring within the condenser tube and the surrounding flue pipe.

In cases where existing chimneys are to be switched from fuels such as coal or oil to natural gas it is usually necessary to modify the chimney anyway in order to make it suitable for high vapor content of gas-fired smoke products. The chimney condenser will take the place of the normal revisions and the chimney condenser will raise the thermal efficiency whereas the usual revisions to chimneys for gas use lower efficiency.

The use of pre-heated air is recommended in gas-burning applications wherever possible in order to lower the percentage of excess air. In most domestic applications and a large percentage of industrial applications no provision is ever made to do this. The chimney condenser provides a natural and logical source of air pre-heating and in this sense, another increment in efficiency will result from its use.

The efficiency of a furnace in imparting heat to air or water depends directly on the temperature differential between combustion chamber and fluid or air being heated. By using pre-heated air for combustion and by lowering the percentage of excess air a considerably hotter combustion zone temperature will result and hence the furnace efficiency will improve on a third score.

As mentioned earlier, the fact that no combustion air is drawn from inside the building will reduce the heat demands from the building and this will constitute a fourth overall thermal efficiency booster.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
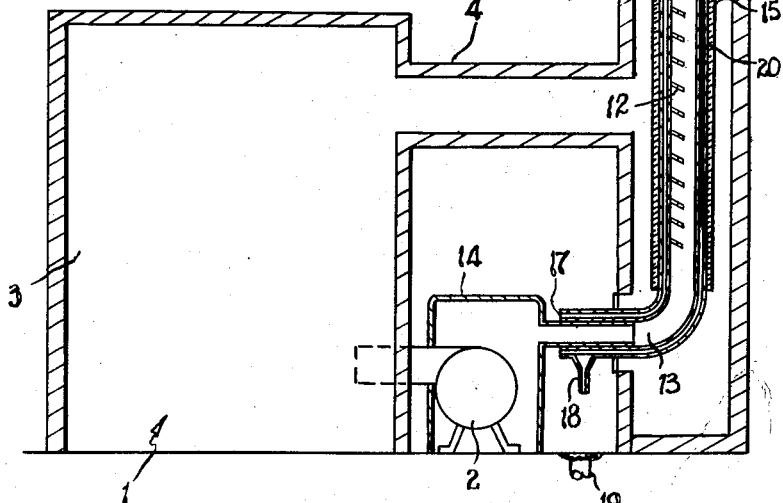
FIGURE 1 is a schematic side elevation of a typical household furnace installation, sectioned in part to show the interior thereof.

Proceeding now the describe my invention in detail, reference should be made to FIGURE 1 of the accompanying drawings in which I have illustrated a furnace collectively designated 1 consisting of a burner unit 2 communicating with a combustion chamber 3, said combustion chamber having a connection 4 with a conventional smoke stack 5.

The smoke stack or chimney 5 normally consists of a brick-lined stack terminating in cap 6 externally of the building and communicating with the atmosphere.

My condenser collectively designated 7 consists, in this embodiment, of an elongated tube 8 situated co-axially within the chimney 5 and extending therethrough. It is desirable that this tube 8 be made of metal having good conducting characteristics and the outer surface 9 is preferably protected by glazing or some other corrosion resistant material (not illustrated).

The upper end 10 of this elongated tube extends beyond the cap 6 of the stack or chimney then curves over and downwardly to form the extremity 11 which is open to the atmosphere. Vanes 12 are secured to and extend from inner and outer surfaces of the duct 8 to assist in turbulating the air passing downwardly therethrough and the gases passing upwardly therepast to ensure that the air and gases contact the surfaces of the duct continuously and to prevent a wire drawing effect occurring.

The lower end 13 of the elongated duct 8 passes downwardly below the connection 4 to the smoke stack and is routed into a hood 14 covering the burning unit 2 so that the only source of air for the burning unit is drawn downwardly through the duct 8 from the outside atmosphere.

Means to collect condensate forming upon the outer surface of the elongated duct 8 are provided and take the form of a cylindrical shroud 15 co-axially surrounding the lower portion of the duct and being spaced therefrom by means of a spider 16. This shroud is closed at the lower end 17 thereof and terminates in a funnel 18 of similar means so that condensate collected within the shroud may be drained therefrom and disposed of as for example, through sewer connection 19. It will be appreciated that the products of combustion will impinge upon the shroud where it passes the duct 4 and this may cause re-evaporation of the condensate to take place. In order to prevent this occurrence, an insulated jacket 20 surrounds the shroud, the upper end 21 of which extends beyond the entrance of the duct 4 to the chimney or exhaust duct 5 and beyond the occurrence of the dew joint of the exhaust gases. As this joint shifts depending upon the furnace load it is preferable (particularly in industrial installations) that the shroud be adjustable lengthwise along the duct, but as this adjustment will take a conventional form such as sliding sleeves, it has not been illustrated.

Figure 2:
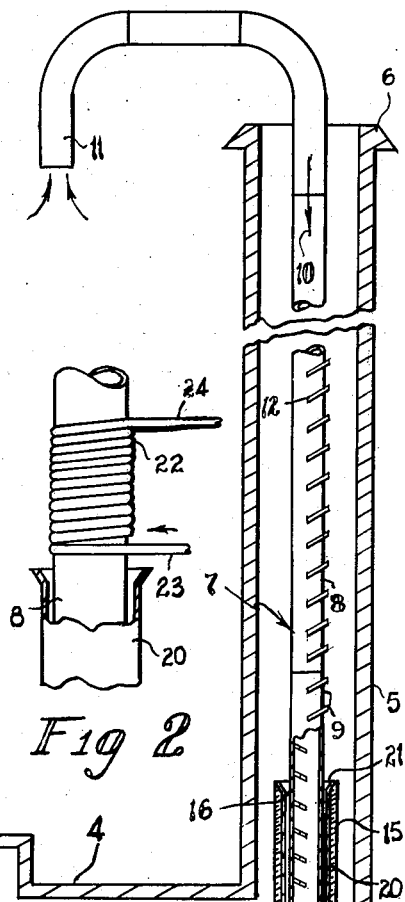
FIGURE 2 is a fragmentary schematic view of an alternative condenser system.

Reference to FIGURE 2 will show an alternative condenser arrangement including the elongated tube 8 part of which is surrounded by condenser coils 22 which in turn may be connected to a source of liquid coolant (not illustrated) through the conduits 23 and 24. The shroud 15 is arranged co-axially around the coil 22 and the duct 8 to collect the condensate as hereinbefore described.

In operation, relatively cold air from the external atmosphere is drawn downwardly through the duct 8 and routed to the burner unit 2. The exhaust gases pass upwardly through the stack and the majority of the water vapor is condensed upon the outer surface of the duct 8. The latent heat of this operation is picked up by the air passing downwardly therethrough thus providing a supply of pre-heated air as hereinbefore mentioned and the condensate is collected by the shroud 20 and routed to the disposal point 19 as hereinbefore described.

Figure 3:
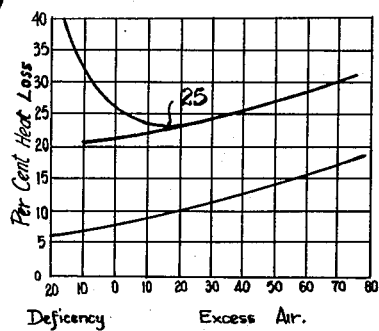
FIGURE 3 is a graph showing the percentage heat loss due to incomplete combustion.

FIGURE 3 shows a graph illustrating the heat loss by the combustion of hydrogen together with the heat loss due to incomplete combustion which is primarily dependent on the air supply. It will be seen that the point of intersection 25 of the two graph lines shows the optimum of operation in the burning of natural gas, for example, and that the heat loss is approximately 22% and I believe that the majority of this is recoverable by condensing the water vapor from the flue gases and recovering the latent heat of this operation.

Figure 4:
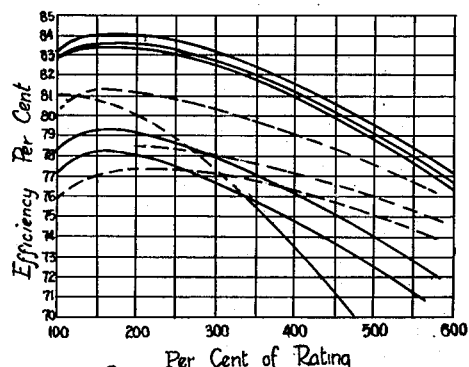
FIGURE 4 is a graph showing the comparative efficiency rates of the various fuels.

FIGURE 4 shows the efficiency ratings of the various fuels for reference purposes.

Although my condenser device is adapted for use with any form of hydro-carbon and air operation, the following examples are given specifically relating to natural gas due to the relatively high water vapor content of the flue gases thereof.

The weight and heat balance calculations given are based on stoichiometry which may be defined as the mathematics of chemical reactions and processes. As such it relates to all the quantitive aspects of chemical changes, both mass and energy. Stoichiometry is based on the absolute laws of conservation of mass and of energy and on the chemical law of combining weights, which makes stoichiometry as exact as any other branch of mathematics and is particularly applicable to the problem solved by the present invention.

An example of burning natural gas with low excess air is as follows:

| Flue Gas Analysis | Percent |
|---|---|
| Carbon dioxide | 9.5 |
| Carbon monoxide | 1.5 |
| Oxygen | 2.0 |
| Nitrogen | 86.7 |
| | 99.7 |

This 100% equals 100 mols.

Assuming that the fuel contains no inert gases, its composition was probably:

| | | |
|---|---|---|
| Hydrogen | mols | 21.0 |
| Carbon | do | 11.3 |
| Excess air | percent | 5.05 |

Weight of fuel per 100 mols. of dry flue gas is (at 100° F. and 750 mm. entry and 500° F. exit):

| | |
|---|---|
| Carbon (C) | 135.6 lb. |
| Hydrogen ($H_2$) | 42.4 lb. |
| Total | 178.0 lbs. hydrocarbon |

Dry air entering—255 cu. ft. per lb. of fuel
Volume of dry flue gas—398 cu. ft. per lb. of fuel
Volume of water vapor in flue gas—83.6 cu. ft. per lb. of fuel.

If the entering air had a relative humidity of 50% the moisture in flue gas from this source would equal 17.8% of the water vapor resulting from hydrogen in the fuel.

Expressed as a chemical formula by weight, the following would be typical:

$$CH_4 + 2O_2 \rightarrow CO_2 + 2H_2O$$
$$16.032 + \quad 64 \quad \quad 44 + 36.032$$

From the foregoing, it will be appreciated that a relatively large percentage of the heat losses in flue gases can be recovered and either be used to pre-heat the combustion air or can be routed for other purposes, if desired.

The extraction of the latent heat evaporation from the flue gases will, of course, decrease the temperature thereof, but the natural draft of the smoke stacks or exhaust ducts will not be adversely affected because of the relatively large decrease in weight of the flue gases due to the removal therefrom of the water vapor.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. The combination of a furnace having a burner, a vertical stack for products of combustion, a flue extending laterally from said furnace to said stack and communicating with the latter at a point spaced above the lower end of the stack, and a combined vapor condenser and air pre-heater comprising an elongated air duct extending longitudinally centrally through said stack, said duct having an upper end portion projecting outwardly from the upper end of the stack and communicating with the atmosphere and also having a lower end portion projecting laterally from the stack at a point below said flue and communicating with said burner, a tubular shroud for collecting condensed vapor coaxially enclosing the lower end portion of said duct in spaced relation therefrom, said shroud extending upwardly along said duct in said stack to a point above said flue, means for draining condensed vapor from the lower end of said shroud, and a jacket of heat insulating material provided on said shroud, said jacket extending downwardly from the upper end of the shroud to a point below the connection of said flue to said stack whereby to prevent condensed vapor in the shroud from being re-evaporated by products of combustion entering said stack through said flue.

2. The combination as defined in claim 1 wherein the upper end portion of said duct projecting from said stack is of an inverted U-shaped configuration and has a downwardly directed air inlet disposed exteriorly at one side of the upper end of the stack.

References Cited in the file of this patent

UNITED STATES PATENTS

| | | |
|---|---|---|
| 362,362 | Cook | May 3, 1887 |
| 553,542 | Richter | Jan. 28, 1896 |
| 894,856 | Roake | Aug. 4, 1908 |
| 975,894 | Ruud | Nov. 15, 1910 |
| 1,301,863 | MacDonald | Apr. 29, 1919 |
| 1,473,422 | Farquhar | Nov. 6, 1923 |